Oct. 31, 1967  J. C. BOCK  3,349,754
HEAT EXCHANGE DEVICE
Filed June 29, 1966  4 Sheets-Sheet 1
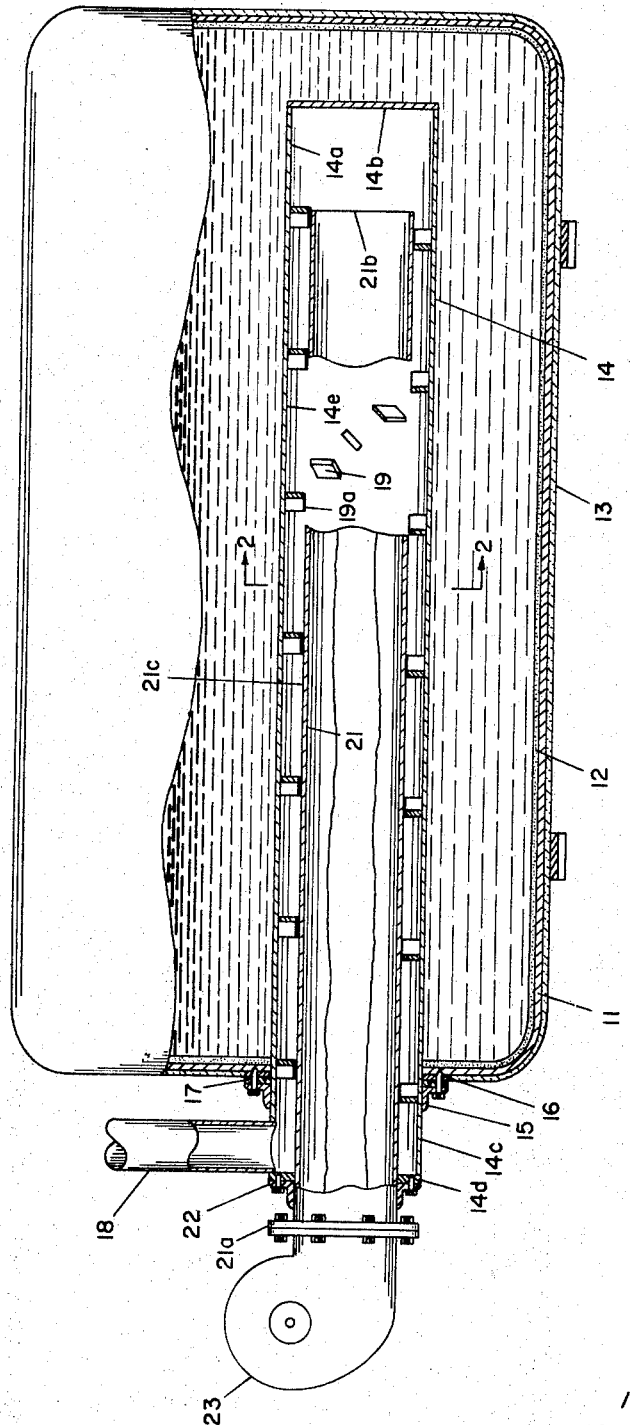
INVENTOR
JOHN C. BOCK
BY Joseph G. Werner
ATTORNEY Oct. 31, 1967      J. C. BOCK      3,349,754
HEAT EXCHANGE DEVICE
Filed June 29, 1966      4 Sheets-Sheet 2

INVENTOR
JOHN C. BOCK
BY
*Joseph G. Werner*
ATTORNEY

Oct. 31, 1967

J. C. BOCK 3,349,754

HEAT EXCHANGE DEVICE

Filed June 29, 1966

INVENTOR
JOHN C. BOCK
BY
*Joseph G. Werner*
ATTORNEY

Oct. 31, 1967   J. C. BOCK   3,349,754
HEAT EXCHANGE DEVICE
Filed June 29, 1966   4 Sheets-Sheet 4

INVENTOR
JOHN C. BOCK
BY Joseph G. Werner
ATTORNEY

United States Patent Office 3,349,754
Patented Oct. 31, 1967

3,349,754
HEAT EXCHANGE DEVICE
John C. Bock, Madison, Wis., assignor to Bock Corporation, Madison, Wis., a corporation of Wisconsin
Filed June 29, 1966, Ser. No. 561,554
4 Claims. (Cl. 122—17)

ABSTRACT OF THE DISCLOSURE

A heat exchange device having a central core within a heat conductive tubular flue mounted in a fluid tank. The core and the flue together define an annular passage for hot combustion gases or heating or cooling fluid. A plurality of baffles are secured in good heat conductive contact to the inside of the flue to define a spiral flow path through the annular passage for the hot combustion gases. The function of the core is to force the hot combustion gases outwardly to the base of the baffles and to the primary heat exchange surface, that is, the flue wall, for the efficient heat exchange with the fluid in the tank. A flange may extend radially outward from the end of the core within the outlet end of the flue a substantial distance to partially restrict fluid flow within the annular passage between the flue and the core.

---

This invention relates generally to heat exchange devises and more particularly to flues for effecting efficient heat transfer between fluids, liquids or gases, passing through the flue and a medium surrounding the flue.

My invention is concerned with the improvement of the heat exchange devices such as described in U.S. Patents 2,687,747 and 2,950,740 wherein a series of baffle elements are spirally arranged within a heat conductive tubular flue to extend the time and path of contact between the flue gases and the heat conductive flue. Each of the baffle elements is heat conductive and secured in good heat conductive contact to the internal surface of the wall of the flue so that the baffle elements themselves serve to absorb heat from the flue gases and transfer it to the wall of the flue and hence to the medium surrounding the flue.

It has been found that the heat exchange devices such as those disclosed in the above identified patents have had to be limited to relatively small diameter flues, usually less than about eight inches in diameter for efficient operation. The reason for this is that if, in an eight inch diameter flue, the baffle elements are made about four inches long so as to extend to the center of the flue, they are too long to conduct heat rapidly to the wall of the flue and they also tend to burn off at the inner ends. On the other hand, if the baffle elements are kept shorter, as shown in the above mentioned patents, a central opening or column is created through the flue and much of the heat merely rushes through this central opening and escapes. This flow pattern, which is schematically illustrated in FIG. 7 of the accompanying drawings, results in somewhat less than maximum efficiency, particularly in larger diameter flues since the hottest gases rushing through the central column do not come into contact and pass over the surfaces of the baffle elements and much of their heat is lost.

My new and improved heat exchange device incorporates a core in the central column which permits the use of larger diameter flues than has been possible heretofore. In one form of my invention, the burner fires through this central core and the direction of the heat flow is then reversed to flow through the baffle elements and close to the wall of the flue. In another form, the central column is closed by a core member which forces the hot gases to flow outwardly and through the baffle elements in close proximity to the wall of the flue for efficient heat exchange.

Accordingly, an object of my invention is to provide a new and improved heat exchange device which effects a greater heat exchange between fluids passing through a heat conductive flue and the medium surrounding the flue and which permits the use of larger diameter flues than in the past.

Another object of my invention is to provide a new and improved heat exchange device of the type described wherein the hot fluids will pass closely adjacent the wall of the flue and over the opposed surfaces of heat conductive baffle elements which are secured in good heat conductive contact on the inner surface of the wall of the flue so that a maximum amount of heat may be absorbed by the baffle elements and transferred to the wall of the flue and hence to the medium surrounding the flue.

Further objects, features and advantages of my invention will be apparent from the following detailed description taken in conjunction with the accompanying drawings wherein several embodiments of my invention have been selected for exemplification.

For illustrative purposes only, my improved heat exchange device is shown in the drawings as it may be adapted to residential or industrial water heaters wherein hot combustion gases are passed through a metal flue whereby heat from the gases is transferred to the water in the tank. It is understood that my invention may find application wherever it is desired to effect efficient heat transfer between a fluid, liquid or gas, passing through a heat conductive flue and a medium surrounding the flue. The principles of my invention may be employed equally well for cooling a medium as for heating the medium.

In the drawings:

FIG. 1 is a sectional view of my invention as it may be adapted to a water heater with portions thereof broken away.

Figure 5:
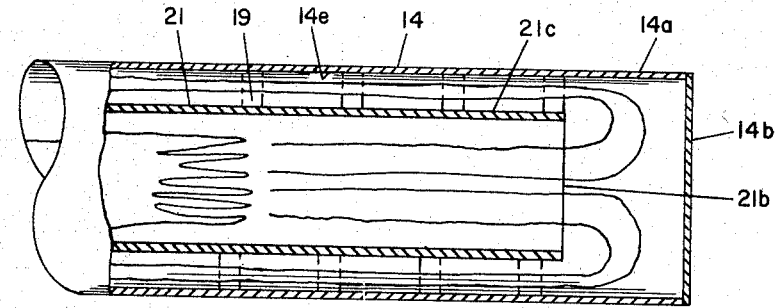
FIG. 5 is a schematic illustration of the fluid flow pattern through the heat exchange device of FIG. 1.

Referring now more particularly to the drawings wherein like numerals refer to like parts throughout the several views, FIG. 1 shows a horizontally disposed steel walled tank 11 preferably having a porcelain lining 12 for protecting the steel tank 11 against corrosion. The tank 11 also may have an insulating jacket 13 for cutting down the heat loss from the tank.

A heat conductive tubular metal flue 14 extends into tank 11 through one end thereof. The flue 14 has an inner end 14a which is closed by an end plate 14b and has an exhaust end 14c which is closed by an end plate 14d. The exhaust end 14c of the flue 14 is fixedly secured in the steel wall of tank 11 by an annular flange 15 which may be welded to the wall of the flue 14 and bolted to an annular ring 16 which is welded to the end wall of tank 11. A suitable gasket 17 may be positioned between flange 15 and ring 16 for providing a fluid tight seal.

The flue 14 has an exhaust outlet 18 mounted on its exhaust end 14c for discharging combustion gases from the flue 14.

Figure 2:
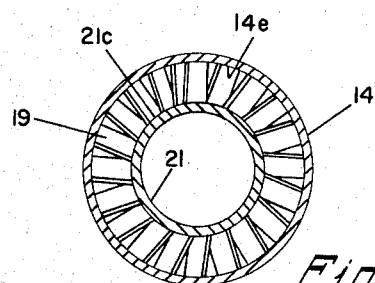
FIG. 2 is an enlarged sectional view taken along line 2—2 of FIG. 1.

Heat conductive metal baffle elements 19 are secured in heat conductive contact, by welding or the like, to the inner surface 14e of the tubular flue 14 in a spiral pattern as shown in FIGS. 1 and 2; that is, they are displaced longitudinally and circumferentially from one another with substantial uniformity of spacing and direction to define a spiral fluid flow path in flue 14. The baffle elements 19 are set at an angle to the longitudinal axis of the flue 14 in a direction counter to the direction of their spiral pattern and those surfaces of the baffle elements 19 which face toward the closed inner end 14a of the flue 14 slant toward the exhaust end 14c so that the combustion gases passing through the flue 14 will be given a spiral movement in a direction counter to the spiral arrangement of the baffle elements 19.

The baffle elements 19 extend radially inwardly a distance substantially less than the inner radius of the flue 14 and the inner ends 19a of baffles 19 thus define a central column which is substantially filled by a cylindrical core 21. The particular core 21 shown is made of stainless steel and extends into the flue 14 from the exhaust end 14c to a point about six to twelve inches from the end plate 14b at the inner end 14a thereof. The core 21 may be mounted by any suitable means such as annular flange 22 which may be welded to the core 21 and bolted to the plate 14d of the flue 14.

A conventional pressure firing unit 23 may be bolted to the flanged inlet end 21a of the core 21 so as to fire directly into the inlet end of the core which serves as a combustion chamber as shown in FIG. 1.

Figure 7:
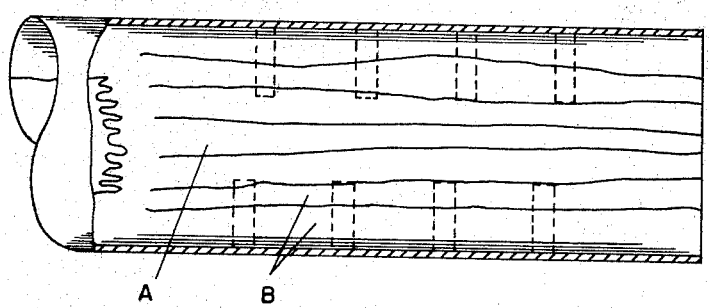
FIG. 7 is a schematic illustration of the fluid flow pattern through known heat exchange devices such as shown in U.S. Patents 2,687,747 and 2,950,740.

The new and improved flow pattern through my heat exchange device is best seen in FIGS. 1 and 5. The hot combustion gases pass through the core 21 and out the outlet end 21b thereof into the closed end 14a of the flue 14. The gases are there deflected by the end plate 14b which reverses their direction of flow. The gases thus move from right to left in FIGS. 1 and 5 through substantially the entire length of the flue 14 in the spiral path defined by the baffle elements 19 between the outer surface 21c of core 21 and the inner surface 14e of the flue 14. The hot combustion gases pass over the opposed surfaces of the baffle elements 19 and therefore cause such elements to be heated to a higher degree than in known heat exchange devices such as illustrated in FIG. 7 wherein the hottest gases A pass through the central column of the flue. As is shown in FIG. 7, the hottest gases pass directly through the flue of the known device in an unrestricted manner with little heat being transferred from these gases to the baffles in the flue. The cooler currents B travel in the path defined by the baffle elements. As is readily apparent in my new device, the hottest gases are forced outwardly to travel in a path adjacent the inner surface 14e of the flue 14 thus enabling the wall of the flue 14 and the baffles 19 to absorb heat from these currents of the hottest combustion gases. The baffle elements 19 being secured in good heat conductive contact with the inner surface 14e of the flue 14, transfer their heat by conduction to the wall of the flue and, thus, to the medium in the tank 11 surrounding the flue 14.

Figure 3:
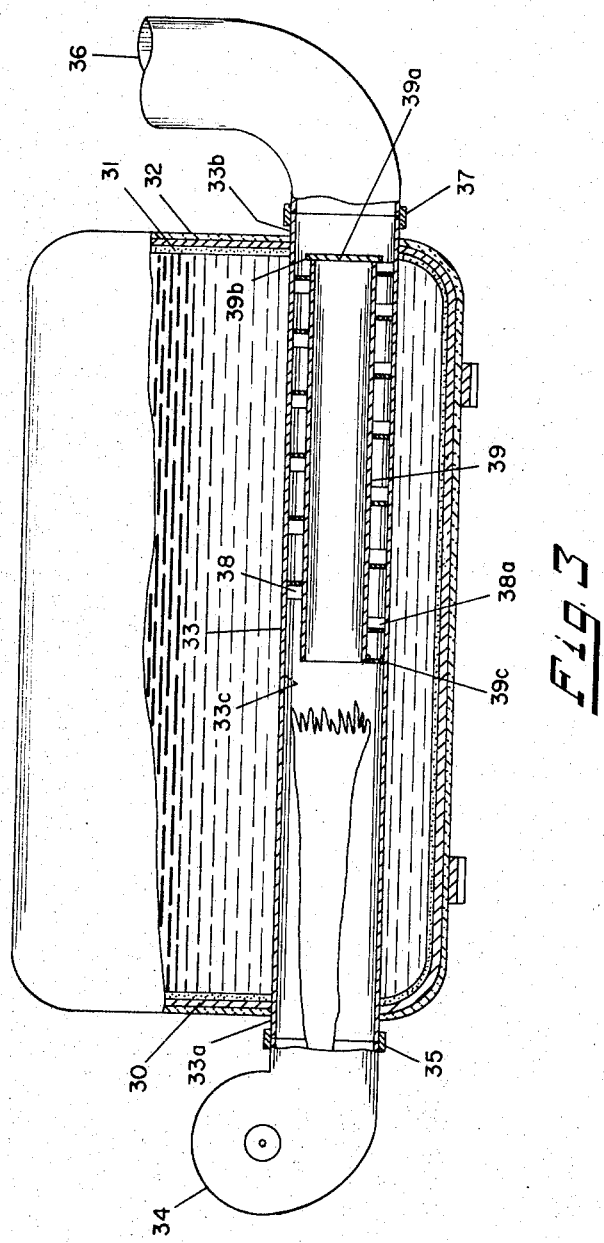
FIG. 3 is a sectional view of a modified form of my invention as it may be adapted to a water heater with portions thereof broken away.

FIG. 3 illustrates a modified form of my invention as it may be incorporated into a water heater and shows a steel walled tank 30 which like tank 11 may have a porcelain lining 31 for protecting the tank against corrosion. The tank 30 may also have an insulating lining or jacket 32 for cutting down the heat loss from the tank. A heat conductive tubular metal flue 33 has its inlet end 33a secured in one end of the tank 30 and its outlet end 33b secured to the other end of the tank 30. The flue 33 is suitably sealed against leakage as by welding to the ends of the tank.

The water heater has a conventional high pressure burner unit 34 fixedly mounted on the flue 33 so as to fire directly into the inlet end 33a of the flue. The burner unit 34 may be mounted on the flue 33 by any suitable means such as conventional pipe coupling clamps 35. An exhaust pipe 36 is attached to the outlet end 33b of the flue by coupling 37 or the like.

Heat conductive metal baffle elements 38 are secured at their ends to the inner surface 33c of the tubular flue 33 in a spiral pattern as shown in FIG. 3, that is, like in flue 14, they are sequentially displaced longitudinally and circumferentially from one another with substantial uniformity of spacing and direction to define a spiral path. The baffle elements 38 are set at an angle to the axis of the flue 33 in a direction counter to the direction of their spiral pattern and with their inlet end facing surfaces slanting toward the outlet end 33b of the flue 33. Thus, the combustion gases passing through the flue 33 will be given a spiral movement in a direction counter to the spiral arrangement of the baffle elements 38.

The inner ends 38a of the baffle elements 38 define a central column which is substantially filled with a cylindrical core 39. The particular core 39 shown comprises a stainless steel tube closed at one end by a flat disk 39a which provides a transversely extending flange 39b at one end of the core 39. Core 39 is inserted into the central column defined by the inner ends 38a of the baffle elements 38 from the outlet end 33b of the flue 33 until the flange 39b engages the first baffle. The core may be secured in place by spot welding an angle iron such as 39c to the core 39 and to the inner surface 33c of the wall of the metal flue 33.

In this embodiment of my invention the pressure firing unit 34 fires directly into the inlet end 33a of the flue 33 and the baffle elements 38 and core 39 extend only through a portion of the length of the tubular flue 33 to a point adjacent the burner flame as shown in FIG. 3.

While a hollow stainless steel core 39 is shown in the drawings, it is understood that the core may also be solid and may be made of any suitable material such as fireclay or the like which will maintain its rigidity under the high heat conditions in the flue.

The transversely extending flange portion 39b of disk 39a is particularly advantageous in heating devices having pressure burner units firing directly into the inlet end of a flue wherein it acts as a baffle at the outlet end of the flue to give a somewhat more even distribution of heat throughout the length of the flue and thus increases efficiency in this type of heat exchange device.

Figure 6:
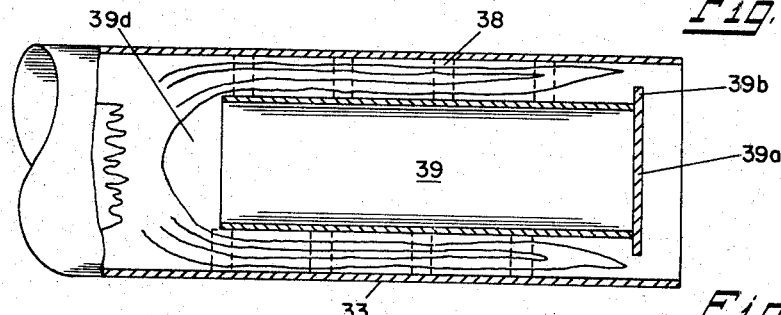
FIG. 6 is a schematic illustration of the fluid flow pattern through the heat exchange device of FIG. 3.

The closed cylindrical stainless steel core 39 causes a generally cone-shaped deflecting cushion, shown schematically at 39d in FIG. 6, to be formed at the open end of the core 39. The combustion gases are thus deflected outwardly by the cushion 39d and core 39 into the spiral path defined by the baffle elements 38. The core 39 thus blocks off the central column and causes the hottest gases which, as shown in FIG. 7, normally would flow through the central column to pass over the opposed surfaces of the baffle elements 38 and therefore cause such elements to be heated to a higher degree than in known heat exchange devices. The baffle elements 38 which are secured in heat conductive contact with the wall of the flue 33 then transfer this heat by conduction to the wall of the flue 33.

By comparing the flow pattern in this embodiment of my improved heat exchange device shown schematically in FIG. 6, with the flow pattern of the known heat exchange devices shown in FIG. 7, it is readily seen that the core 39 deflects the current of hottest gases outwardly into the spiral path defined by the baffle elements 38. The heat may be absorbed from the gases by the baffle elements 38 as the gases pass through the baffled flue 33. The baffle elements 38 being secured in good heat conductive contact with the inner surface of the flue 33 transfer their heat by conduction to the wall of the flue and thus, to the medium surrounding the flue.

Figure 4:
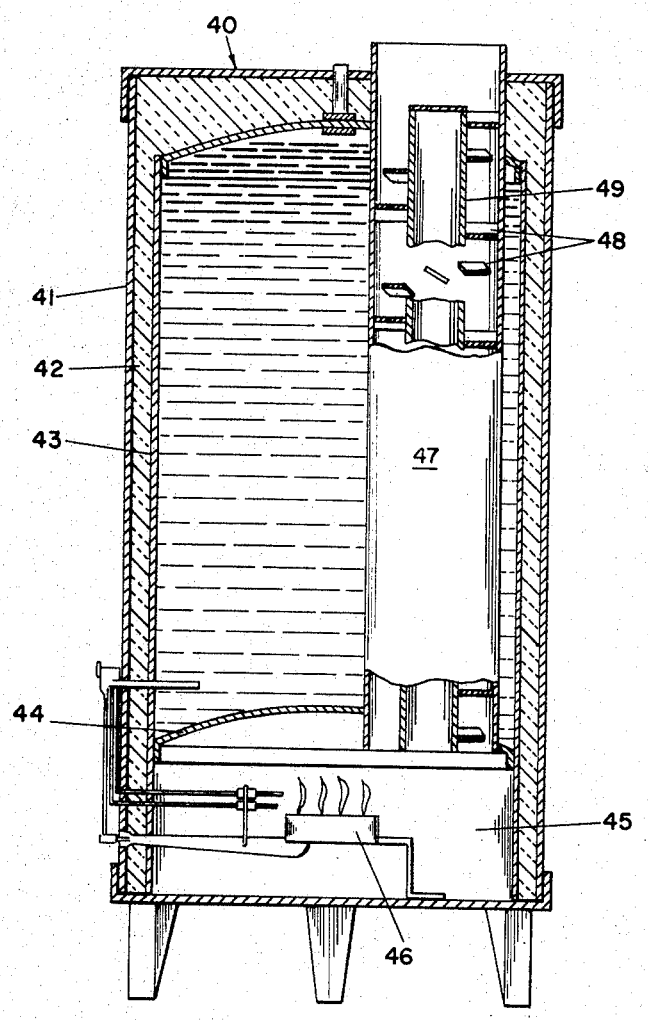
FIG. 4 is a sectional view of another modified form of my invention as it may be adapted to a vertically disposed water heater with a portion thereof broken away.

FIG. 4 shows still another modified form of my new and improved heat exchange device which may be used advantageously in connection with heating devices having atmospheric combustion chambers such as the conventional vertically disposed water heater 40. Water heater 40 has a surrounding casing 41 confining a heat insulating material 42 between casing 41 and a tank 43. The wall of the tank 43 extends downwardly below the bottom portion 44 of the tank to provide a combustion chamber 45, the combustion chamber containing the usual burner 46 for a suitable fuel such as natural gas.

In addition to the heat transferred to the water in the tank through the bottom wall, a tubular metal flue 47 extends through the top and bottom walls of the tank 43 at a position to be surrounded by the water in the tank so that the hot exhaust or flue gases from the combustion chamber 45 pass therethrough to impart heat to the water. The flue 47, the baffles 48 and core 49 are substantially the same as those shown in FIG. 3 except that in this instance where the burner 46 operates in an atmospheric combustion chamber such as 45, the baffle elements extend inwardly further and core 49 is smaller in diameter in relation to the flue and extends substantially through the entire length of the flue 47 as shown in FIG. 4. Also, the transversely extending flange 39b, shown in FIG. 3 may be eliminated.

An important advantage of my new and improved heat exchange devices is that they permit the efficient use of larger diameter flues than in present baffled heat exchange devices for greater heat transfer than was possible in the past. In the known baffled heat exchange devices the diameter of the flue had to be relatively small for the reasons mentioned hereinbefore.

That embodiment of my new and improved heat exchange device shown in FIG. 1, is particularly advantageous in that the flue 14 thereof is mounted at only one end of the tank 11 with the inner end 14 being disposed in spaced relation in the tank. This allows for longitudinal expansion and contraction of the flue 14 without building up stresses in the tank 11. This form is also most efficient in that it allows the flue to be baffled throughout substantially its entire length for greatest heat exchange and yet permits pressure firing without danger of burning off the ends of the baffles.

The end plate 14b which is spaced from the end of the tank 11 and is in contact with the water, or other medium to be heated, gives higher efficiency because of the increased contact area in comparison to a heat exchange device having a flue of equal diameter which extends completely through the tank. The flue 14 may easily be removed from the tank 11 for maintenance inspection and repairs if necessary by merely disconnecting flange 15 from the tank wall and pulling the flue 14 out of the tank.

It is understood that my invention is not confined to the particular construction and arrangement of parts herein illustrated and described, but embraces all such modified forms thereof as come within the scope of the following claims.

I claim:
1. A heat exchange device comprising:
 (a) a tank,
 (b) a heat conductive tubular flue mounted in said tank and having a closed inner end disposed within said tank and an exhaust end,
 (c) a plurality of baffles secured in heat conductive contact to the inner surface of said tubular flue and projecting inwardly to define a central column in said tubular flue,
 (d) an elongated core disposed within said central column,
 (e) a burner firing into said flue,
 (f) said baffles being disposed in said flue in a spiral pattern to define a fluid flow path through said flue between the inner surface of said flue and said core,
 (g) said baffles being tilted at an angle in a direction counter to the direction of their spiral pattern to guide said combustion gases through said flue in a spiral path counter to the direction of the spiral pattern of said baffles, and
 (h) an exhaust outlet at the exhaust end of said flue for discharging the combustion gases from said flue.

2. A heat exchange device comprising:
 (a) a heat conductive tubular flue having a fluid inlet end and a fluid outlet end,
 (b) a plurality of baffles secured in heat conductive contact to the inner surface of said tubular flue and projecting inwardly to define a central column in said tubular flue,
 (c) an elongated core disposed in said central column to prevent fluid flow therethrough,
 (d) said baffles being disposed in said flue in a spiral pattern and having opposed surfaces facing respectively toward said inlet end and said outlet end to define a spiral fluid flow path through said flue between the inner surface of said flue and said core, and
 (e) a transversely extending annular flange at one end of said core within the outlet end of said flue, said flange extending radially outward from said core a substantial distance to partially restrict fluid flow between said core and said flue.

3. The invention described in claim 2 wherein the flange is an extension of a circular disc attached to the end of the core to prevent fluid flow therethrough.

4. A heat exchange device comprising:
 (a) a heat conductive tubular flue having a fluid inlet end and a fluid outlet end,
 (b) a plurality of baffles secured in heat conductive contact to the inner surface of said tubular flue and projecting inwardly to define a central column in said tubular flue,
 (c) an elongated core disposed in said central column to prevent fluid flow therethrough,
 (d) said baffles being disposed in said flue in a spiral pattern and having opposed surfaces facing respectively toward said inlet end and said outlet end to define a spiral fluid flow path through said flue between the inner surface of said flue and said core, and
 (e) said baffles being tilted at an angle in a direction counter to the direction of their spiral pattern with their inlet end facing the surfaces inclined toward said outlet end to guide the fluid flow through the flue in a spiral path counter to the direction of the spiral pattern of said baffles.

References Cited

UNITED STATES PATENTS

| | | | |
|---|---|---|---|
| 1,500,456 | 7/1924 | Junkers | 122—156 |
| 1,734,310 | 11/1929 | Taylor | 122—182 |
| 2,659,392 | 11/1953 | Frenkel | 138—38 |
| 2,950,740 | 8/1960 | Bock | 138—38 |
| 3,259,107 | 7/1966 | Dolin | 122—136 |

KENNETH W. SPRAGUE, *Primary Examiner.*